US012338752B2

(12) United States Patent
Yu et al.

(10) Patent No.: US 12,338,752 B2
(45) Date of Patent: Jun. 24, 2025

(54) TWO-STEP CAM CONTROLLED EXHAUST VALVE DEACTIVATION TO OPERATE A DIVIDED EXHAUST BOOST SYSTEM

(71) Applicant: SAUDI ARABIAN OIL COMPANY, Dhahran (SA)

(72) Inventors: Xin Yu, New Hudson, MI (US); Andrew Baur, Whitmore Lake, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 6 days.

(21) Appl. No.: 18/059,178

(22) Filed: Nov. 28, 2022

(65) Prior Publication Data

US 2024/0175380 A1 May 30, 2024

(51) Int. Cl.
*F01L 1/34* (2006.01)
*F01L 1/053* (2006.01)
(Continued)

(52) U.S. Cl.
CPC ............ *F01L 1/3442* (2013.01); *F01L 1/053* (2013.01); *F01L 2001/0537* (2013.01);
(Continued)

(58) Field of Classification Search
CPC . F01L 1/3442; F01L 1/053; F01L 2001/0537; F01L 2001/34426; F01L 2201/00; F02D 13/0257
(Continued)

(56) References Cited

U.S. PATENT DOCUMENTS 4,911,115 A 3/1990 Boyesen
7,146,949 B2 12/2006 Mendler
(Continued)

FOREIGN PATENT DOCUMENTS

CN 114961959 A 8/2022
WO 2009022210 A2 2/2009
WO 2024/118485 A1 6/2024

OTHER PUBLICATIONS

Roth, David B. et al., "Valve-Event Modulated Boost System: Fuel Consumption and Performance with Scavenge-Sourced EGR"; SPE International Journal of Engines; vol. 5, Issue 2; pp. 538-546; May 2012 (9 pages).

(Continued)

*Primary Examiner* — Kenneth J Hansen
*Assistant Examiner* — Kelsey L Stanek
(74) *Attorney, Agent, or Firm* — Osha Bergman Watanabe & Burton LLP

(57) ABSTRACT

An exhaust system includes a plurality of cylinders, and each cylinder includes a scavenge exhaust valve and a blowdown exhaust valve. A scavenge path leads from the scavenge exhaust valves and a blowdown path leads from the blowdown exhaust valves. An arrangement activates and deactivates the scavenge exhaust valves and the blowdown exhaust valves. Further included is a cam shaft including a plurality of scavenge cams and a plurality of blowdown cams. During rotation of the cam shaft, the scavenge cams interact with the scavenge exhaust valves to open and close the scavenge exhaust valves when the scavenge exhaust valves are activated. Additionally, during rotation of the cam shaft, the blowdown cams interact with the blowdown exhaust valves to open and close the blowdown exhaust valves when the blowdown exhaust valves are activated, and (Continued)

at different times with respect to the opening and closing of the scavenge exhaust valves.

18 Claims, 6 Drawing Sheets

(51) Int. Cl.
*F01L 1/344* (2006.01)
*F02D 13/02* (2006.01)

(52) U.S. Cl.
CPC . *F01L 2001/34426* (2013.01); *F01L 2201/00* (2013.01); *F01L 2800/06* (2013.01); *F02D 13/0257* (2013.01)

(58) Field of Classification Search
USPC .......................................................... 60/602
See application file for complete search history.

(56) References Cited

U.S. PATENT DOCUMENTS

| | | | | |
|---|---|---|---|---|
| 7,287,378 | B2 | 10/2007 | Chen et al. | |
| 8,495,992 | B2 | 7/2013 | Roth | |
| 8,539,770 | B2 | 9/2013 | Williams | |
| 8,695,338 | B2 | 4/2014 | Sato et al. | |
| 8,863,714 | B1 * | 10/2014 | Moran ................ | F01L 13/0036 123/90.16 |
| 9,080,523 | B1 | 7/2015 | Ulrey et al. | |
| 9,133,795 | B2 | 9/2015 | Riley et al. | |
| 9,518,506 | B2 | 12/2016 | Leone et al. | |
| 9,739,221 | B2 | 8/2017 | Madison et al. | |
| 10,787,949 | B2 | 9/2020 | McConville et al. | |
| 10,947,932 | B2 | 3/2021 | Hakeem et al. | |
| 2006/0144356 | A1 * | 7/2006 | Sellnau .............. | F02D 41/3035 123/90.16 |
| 2007/0119168 | A1 | 5/2007 | Turner | |
| 2014/0182535 | A1 | 7/2014 | Roth et al. | |
| 2015/0260128 | A1 * | 9/2015 | Roth ...................... | F02M 26/14 123/568.13 |
| 2017/0356375 | A1 * | 12/2017 | Glugla .............. | B60W 30/1882 |
| 2020/0256242 | A1 | 8/2020 | Roth et al. | |

OTHER PUBLICATIONS

Zurface, Austin et al., "Design and Development of a Switching Roller Finger Follower for Discrete Variable Valve Lift in Gasoline Engine Applications"; SAE International Journal of Fuels and Lubricants; vol. 5, Issue 3; pp. 1066-1077; Nov. 2012 (12 pages).
Ihlemann, Arndt et al., "Cylinder Deactivation: A technology with a future or a niche application?" Schaeffler Symposium; Valvetrain Systems, 11; pp. 172-187; 2014 (8 pages).
International Search Report issued in corresponding International Application No. PCT/US2023/081117; mailed Mar. 22, 2024 (5 pages).
Written Opinion of the International Searching Authority issued in corresponding International Application No. PCT/US2023/081117; dated Mar. 22, 2024 (7 pages).
Kumar, Praveen et al., "Divided Exhaust Period Assessment for Fuel-Enrichment Reduction in Turbocharged Spark-Ignition Engines"; SAE International Journal of Engines; vol. 17, Issue 3, Article ID: 03-17-03-0022; pp. 1-16; 2024 (16 pages).
Roth, David B. et al. "Divided-Exhaust Turbocharger System with Boost-Valve"; Proceedings of the WCX World Congress Experience; SAE Technical Paper 2018-01-0895; pp. 1-9; Apr. 3, 2018 (9 pages).
Hu, Bo, "Application of Divided Exhaust Period and Variable Drive Supercharging Concept for a Downsized Gasoline Engine"; A thesis submitted for the degree of Doctor of Philosophy; University of Bath, Department of Mechanical Engineering; pp. i-257; Mar. 2016 (273 pages).

* cited by examiner

TWO-STEP CAM CONTROLLED EXHAUST VALVE DEACTIVATION TO OPERATE A DIVIDED EXHAUST BOOST SYSTEM

BACKGROUND

As is generally known, a divided exhaust boost system can be used to reduce internal residual pumping and improve catalyst light-off of a turbocharged spark ignition engine. However, in such a setting, the turbocharger normally fails to deliver the full boost pressure at peak engine loads due to the partial loss of exhaust gas energy to the turbine.

A conventional solution for this issue involves the use of two external valves. In such a system, one blowdown valve is mounted on the route of a blowdown path connected to the turbine inlet. One scavenging valve is mounted on the route of scavenging path connected to the inlet of catalytic converter downstream of the turbine. The two valves are typically on-off valves. However, the arrangement still places constraints on exhaust gas temperature in a manner that adversely affects performance.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an exhaust system including a plurality of cylinders. Each cylinder includes a scavenge exhaust valve and a blowdown exhaust valve. The exhaust system also includes an arrangement that activates and deactivates the scavenge exhaust valves and the blowdown exhaust valves. Additionally, the exhaust system includes a scavenge path leading from the scavenge exhaust valves and a blowdown path leading from the blowdown exhaust valves. Furthermore, the exhaust system includes a cam shaft including a plurality of scavenge cams and a plurality of blowdown cams. During rotation of the cam shaft, the scavenge cams interact with the scavenge exhaust valves to open and close the scavenge exhaust valves when the scavenge exhaust valves are activated. Additionally, during rotation of the cam shaft, the blowdown cams interact with the blowdown exhaust valves to open and close the blowdown exhaust valves when the blowdown exhaust valves are activated, and at different times with respect to the opening and closing of the scavenge exhaust valves.

In one aspect, embodiments disclosed herein relate to a method that includes providing a plurality of cylinders in an engine, each cylinder comprising a scavenge exhaust valve and a blowdown exhaust valve. The scavenge exhaust valves and the blowdown exhaust valves are activated, and a cam shaft including a plurality of scavenge cams and a plurality of blowdown cams is rotated. During rotation of the cam shaft, the scavenge cams interact with the scavenge exhaust valves to open and close the scavenge exhaust valves. Also, during rotation of the cam shaft, the blowdown cams interact with the blowdown exhaust valves to open and close the blowdown exhaust valves, and at different times with respect to the opening and closing of the scavenge exhaust valves.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
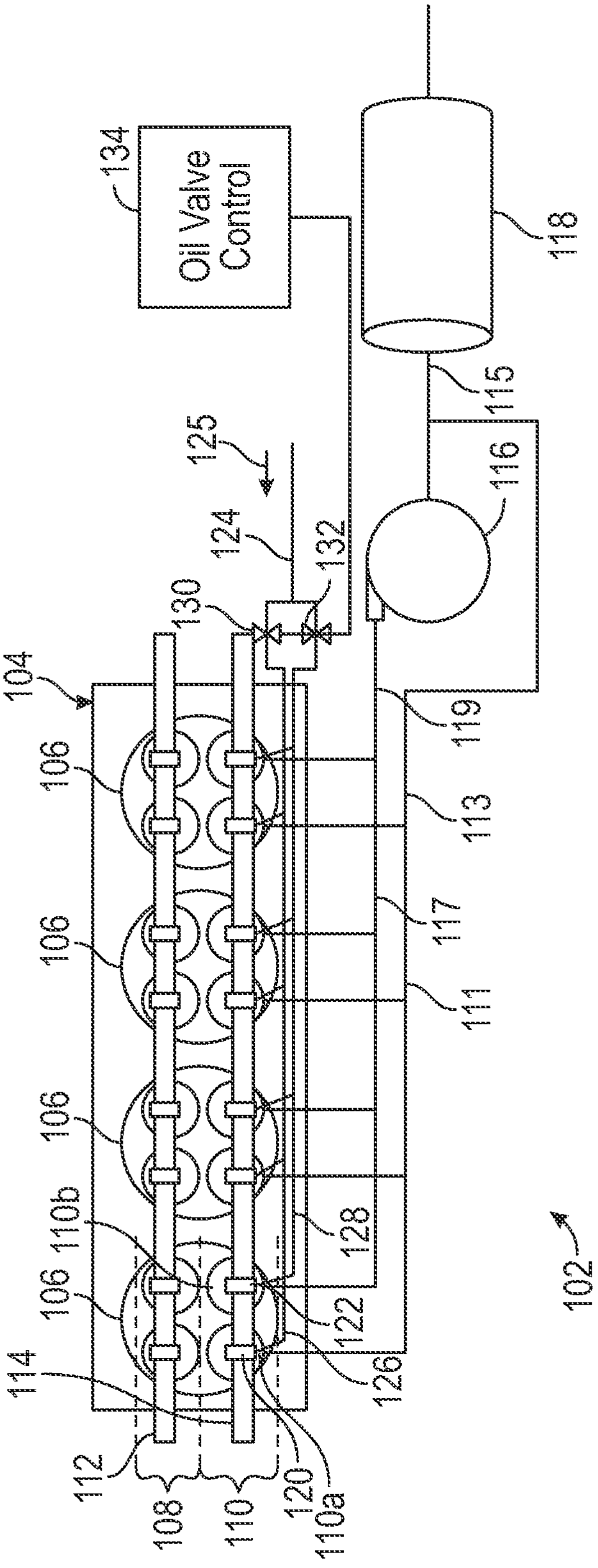
FIG. 1 schematically illustrates an overall exhaust system 102 in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Broadly contemplated herein, in accordance with one or more embodiments, is the use of exhaust valves existing on an engine cylinder head to control the flow of exhaust gas to divided exhaust systems. This then permits an increase in the exhaust gas temperature in view of the exhaust valve design specifications involved, and offers an improvement in flow efficiency into and out of exhaust ports. The result is to expand or multiply the benefit of a divided exhaust boost on engine emission and efficiency.

Also broadly contemplated herein, in accordance with one or more embodiments, is a manner of controlling the noted exhaust to effect a desired flow direction for the divided exhaust boost system requires. To this end, a two-step switchable exhaust valve deactivation arrangement can be used to open and close each of the exhaust valves on a cylinder independently. Such a deactivation system can be embodied by a cam system including cams acting on followers associated with different exhaust valves, and a manner of supplying oil to the valves in a manner to effect independent control of each exhaust valve.

The disclosure now turns to working examples of a divided exhaust system and related components in accordance with one or more embodiments, as described and illustrated with respect to FIGS. 1-5. It should be understood and appreciated that these merely represent illustrative examples, and that a great variety of possible implementations are conceivable within the scope of embodiments as broadly contemplated herein.

Additionally, to facilitate easier reference when describing FIGS. 1 through 5, reference numerals may be advanced by a multiple of 100 in indicating a similar or analogous component or element among FIGS. 1-5.

FIG. 1 schematically illustrates an overall exhaust system 102 in accordance with one or more embodiments. Engine 104 includes a plurality of cylinders 106; four are shown in the example illustrated. Each cylinder 106 includes a pair of intake valves 108 and a pair of exhaust valves 110. An intake cam shaft 112 includes cams for opening and closing the intake valves 108 and, in a manner to be described more fully below, an exhaust cam shaft 114 includes cams for opening and closing the exhaust valves 110. The intake cam shaft 112 and its cams may be configured essentially in any manner deemed suitable or advantageous. By way of one illustrative example, in the context of an exhaust valve configuration as discussed herein, the intake/exhaust valve size ratio can be slightly smaller than in the case of conventional systems.

In accordance with one or more embodiments, one exhaust valve 110 of each cylinder 106 is referred to as a scavenge exhaust valve 110*a* (toward the left of each cylinder in FIG. 1) and the other exhaust valve 110 of each cylinder 106 is referred to as a "blowdown exhaust valve" 110*b* (toward the right of each cylinder in FIG. 1). At the same time, exhaust system 102 is a divided exhaust system where a blowdown path leads to a turbine 116 of a turbocharger, and a scavenge path leads directly to a catalytic converter 118 while bypassing the turbine 116. Thus, in the illustrated example, the scavenge path leads from each scavenge exhaust valve 110*a*, via scavenge manifold 111 and piping 113, directly to piping 115 which leads to catalytic converter 118. Additionally, the blowdown path leads from each blowdown exhaust valve 110*b*, via blowdown manifold 117 and piping 119, to turbine 116. Turbine 116 then connects to catalytic converter 118 via piping 115.

In accordance with one or more embodiments, mounted on exhaust cam shaft 114 are a plurality of scavenge cams 120 and blowdown cams 122. In a manner to be described more fully below, as the exhaust cam shaft 114 rotates, the scavenge cams 120 are configured to actuate an opening and closing of the scavenge exhaust valves 110*a*. During the same rotation of cam shaft 11, the blowdown cams 122 are configured to actuate an opening and closing of the blowdown exhaust valves 110*b* with timing that may differ from that of the opening and closing of the scavenge exhaust valves 110*a*.

In accordance with one or more embodiments, an oil line 124 feeds into the engine 104 in the general direction indicated at 125. Line 124 then splits into two separate galleries (or lines), namely a first gallery 126 and a second gallery 128. The first gallery 126 feeds into each of the scavenge exhaust valves 110*a*, and flow into the first gallery 126 is controlled and admitted by a first oil valve 130. The second gallery 128 feeds into each of the blowdown exhaust valves, and flow into the second gallery 128 is controlled and admitted by a second oil valve 132. A suitable control unit 134 may be provided to control and actuate the opening and closing of the oil valves 130, 132. Generally, the oil line 124, galleries 126, 128, oil valves 130, 132 and control unit 134 may be considered components of an arrangement that activates and deactivates the scavenge exhaust valves 110*a* and the blowdown exhaust valves 110*b*, in a manner to be appreciated more fully below. Among other things, it will be appreciated that:

- the scavenge exhaust valves 110*a* are activated in response to closure of the first oil valve 130 and a reduction in oil pressure in the first oil gallery 126;
- the scavenge exhaust valves 110*a* are deactivated in response to opening of the first oil valve 130 and an increase in oil pressure in the first oil gallery 126;
- the blowdown exhaust valves 110*b* are activated in response to closure of the second oil valve 132 and a reduction in oil pressure in the second oil gallery 128; and
- the blowdown exhaust valves 110*b* are deactivated in response to opening of the second oil valve 132 and an increase in oil pressure in the second oil gallery 128.

In accordance with one or more embodiments, control unit 134 can suitably assume any of a very wide variety of possible forms for the purpose of actuating the oil valves 130, 132. For instance, oil valves 130, 132 may be configured as solenoid or piezo valves with on/off functioning as generally known, and control unit 134 can be configured to send a signal to actuate the valves 130, 132. Also, while oil valves 130, 132 are illustrated and described herein for the purpose controlling the activation and deactivation of exhaust valves 110, the exhaust valves 110 may alternatively be activated/deactivated by another, analogously acting system, such as an electric, pneumatic or piezo system.

In accordance with one or more embodiments, when first oil valve 130 is closed, oil pressure in first gallery 126 is relatively low, at a first oil pressure level. In response to this lower oil pressure, a component of each scavenge exhaust valve 110*a* may be actuated in a manner to deactivate the valve 110*a* such that it remains closed. Additionally, when first oil valve 130 is opened, oil pressure in first gallery 126 is relatively high, at a second oil pressure level that is greater than the first oil pressure level. In response to this higher oil pressure, the noted component of each scavenge exhaust valve 110*a* may be actuated in a manner to activate the valve 110*a* such that it can be opened and closed in normal operation.

Likewise, in accordance with one or more embodiments, when second oil valve 132 is closed, oil pressure in second gallery 126 is relatively low, at a first oil pressure level. In response to this lower oil pressure, a component of each blowdown exhaust valve 110*b* may be actuated in a manner to deactivate the valve 110*b* such that it remains closed. Additionally, when second oil valve 132 is opened, oil pressure in second gallery 128 is relatively high, at a second oil pressure level that is greater than the first oil pressure level. In response to this higher oil pressure, the noted component of each blowdown exhaust valve 110*b* may be actuated in a manner to activate the valve 110*b* such that it can be opened and closed in normal operation.

Generally, in accordance with one or more embodiments, oil pressure at the scavenge and exhaust blowdown valves 110*a*/110*b* may relate directly to the manner of deactivating those valves. However, in accordance with a present working example, it may range from about 2 bar for the lower oil pressure noted above and about 4 bar for the higher oil pressure noted above.

Further, in accordance with one or more embodiments, oil valve control unit 134 may be configured to control the oil valves 130 and 132 relative to one another in a manner to effect a predetermined pattern or protocol of opening and closing the scavenge and blowdown exhaust valves 110*a* and 110*b* with respect to one another. In other words, oil valve control unit 134 may serve to control the oil valves 130 and 132 to effect different protocols for activating and deactivating the scavenge and blowdown exhaust valves 110*a* and 110*b* in any manner deemed suitable or advantageous.

Figure 2:
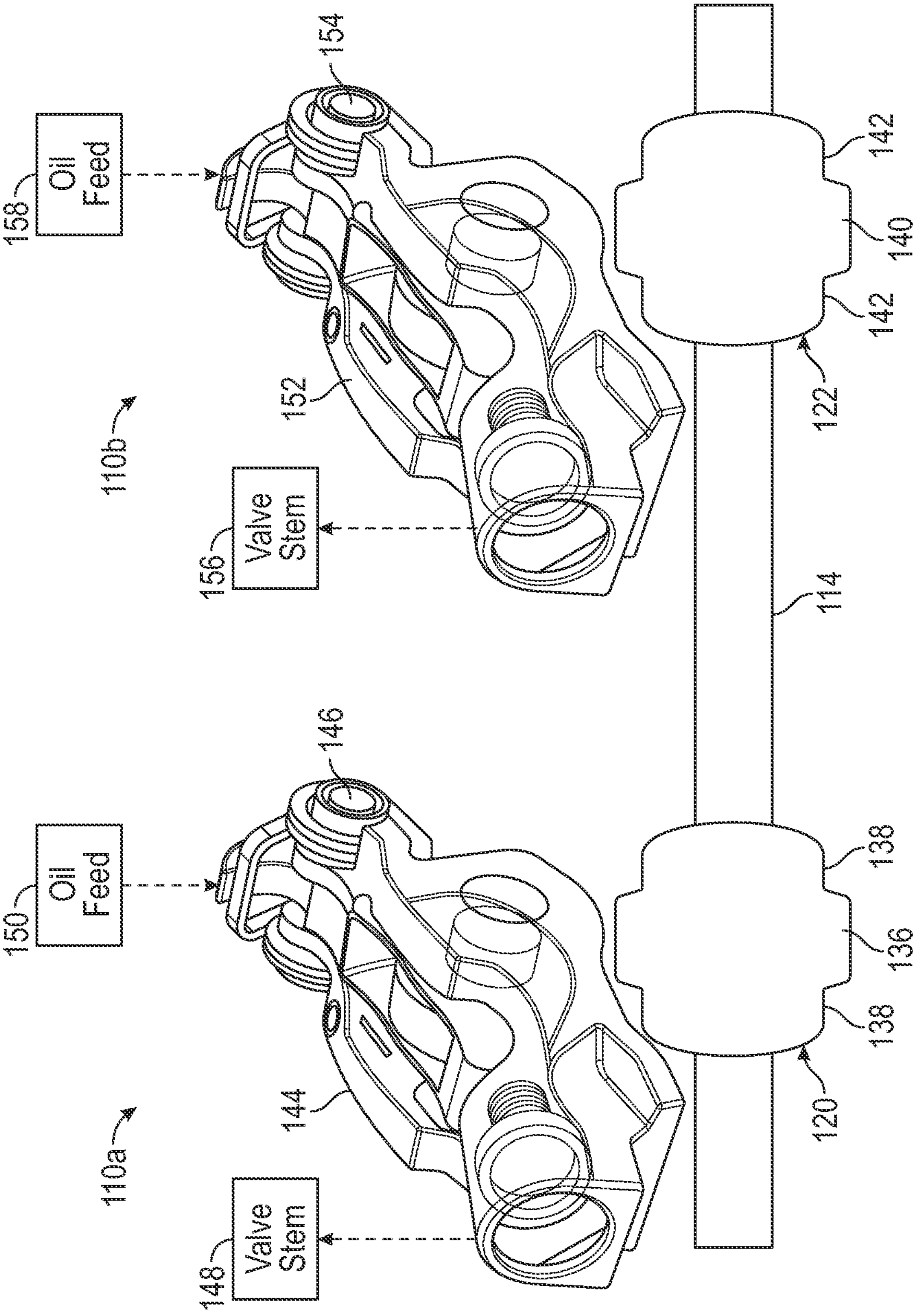
FIG. 2 schematically illustrates a switchable finger follower system in accordance with one or more embodiments.

FIG. 2 schematically illustrates a switchable finger follower system in accordance with one or more embodiments, which may be utilized with the system 102 shown in FIG. 1. Continued reference may be made to both FIGS. 1 and 2 jointly.

In accordance with one or more embodiments, FIG. 2 shows cam shaft 114 with a scavenge cam 120 and a blowdown cam 122 mounted thereon. Viewed along an axial direction with respect to shaft 114, scavenge cam 120 includes a first "off" lobe 138, an "on" lobe 136 and a second "off" lobe 138. Likewise, viewed along an axial direction with respect to shaft 114, scavenge cam includes a first "off" lobe 142, an "on" lobe 140 and "off" lobe 142. Generally, the cam on lobes 136, 140 may be understood as including a cam profile which, during rotation of shaft 114, engages with a movable component (such as one or more portions of switchable finger followers 144, 152 described herein) to periodically move the movable component. On the other hand, the cam off lobes 138, 142 may be understood as including no cam profile capable of effecting the movement of the aforementioned movable component.

In accordance with one or more embodiments, though two off lobes 138 are shown for scavenge cam 120 and two off lobes 142 are shown for blowdown cam 122, it should be understood that such a configuration is merely presented by way of illustrative and non-restrictive example. As an alternative, it is possible to include only one off lobe 138 for scavenge cam 120 and one off lobe 142 for blowdown cam 122. In yet another alternative implementation, it is possible to include two on lobes 136 disposed axially on either side of a single off lobe 138 for scavenge cam 120, and to include two on lobes 140 disposed axially on either side of a single off lobe 142 for blowdown cam 122.

In accordance with one or more embodiments, also illustrated in FIG. 2 are components of a scavenge exhaust valve 110*a* and blowdown exhaust valve 110*b* as found on one of the cylinders 106. Scavenge exhaust valve 110*a* may include a switchable finger follower 144 mounted for pivoting movement about a pivot 146. A first end portion of finger follower 144 may interface with a spring-mounted valve stem 148. An oil feed 150 may lead from first oil gallery 126 to a chamber or receptacle integral with finger follower 144.

In accordance with one or more embodiments, blowdown exhaust valve 110*b* may be similarly configured. Thus, blowdown exhaust valve 110*b* may include a switchable finger follower 152 mounted for pivoting movement about a pivot 154. A first end portion of finger follower 152 may interface with a spring-mounted valve stem 156. An oil feed 158 may lead from second oil gallery 128 to a chamber or receptacle integral with finger follower 152.

In accordance with one or more embodiments, any of a wide variety of possible implementations may be employed for the finger followers 144 and 152. For instance, suitable mechanics of a switchable finger follower may be appreciated, e.g., from Zurface, A., Brownell, S., Genise, D., Tow, P. et al., "Design and Development of a Switching Roller Finger Follower for Discrete Variable Valve Lift in Gasoline Engine Applications," *SAE Int. J. Fuels Lubr.* 5(3):2012, doi: 10.4271/2012-01-1639.

FIGS. 3A-3D schematically illustrate components of a finger follower 344 for a scavenge exhaust valve and in different stages of actuation, in accordance with one or more embodiments. It should be understood that the example shown in FIGS. 3A-3D is merely for illustrative purposes only, and depicts possible modes of actuation at a very general level. As such, the finger follower 344 shown in FIGS. 3A-3D, and its related principles, may be utilized in connection with the arrangements shown in FIGS. 1 and 2.

Figure 3A:
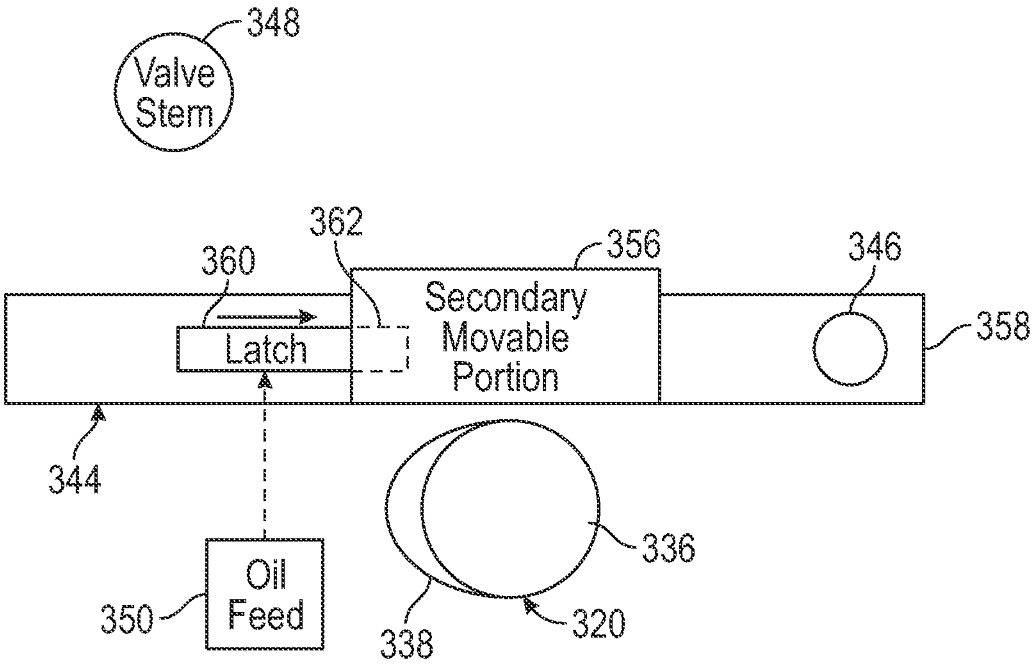
FIGS. 3A-3D schematically illustrate components of a finger follower 344 for a scavenge exhaust valve and in different stages of actuation, in accordance with one or more embodiments.

FIG. 3A shows finger follower 344 in a first configuration, in accordance with one or more embodiments. Generally, finger follower 344 may include a secondary movable portion 356 that may be separately actuated or moved with respect to a main body 358 of the finger follower 344. Towards effecting the separate actuation or movement, finger follower 344 may also include a slidable latch or pin 360 with movement governed by oil feed 350 and its related oil pressure. Oil feed 350, for its part, may be in communication with a first oil gallery such as that indicated at 126 in FIG. 1. Accordingly, when oil pressure in feed 350 is relatively low, the latch or pin 360 may be in an initial "latched", "extended" or "locked" position as shown to hold in place the secondary movable portion 356 so that so that it does not move independently with respect to the main body 358 of the finger follower 344. For instance, latch or pin 360 may be accommodated in a compatible slot or receptacle 362 in secondary movable portion 356.

In accordance with one or more embodiments, also illustrated schematically in FIG. 3A is a scavenge cam 320, which may be configured similarly to the scavenge cam 120 described and illustrated with respect to FIGS. 1 and 2. Thus, also illustrated in FIG. 3A are an on lobe 336 and an off lobe 338. Here, a nose of the on lobe 336 is shown in a "9 o'clock" position where it has not yet engaged with any portion of finger follower 344.

Figure 3B:
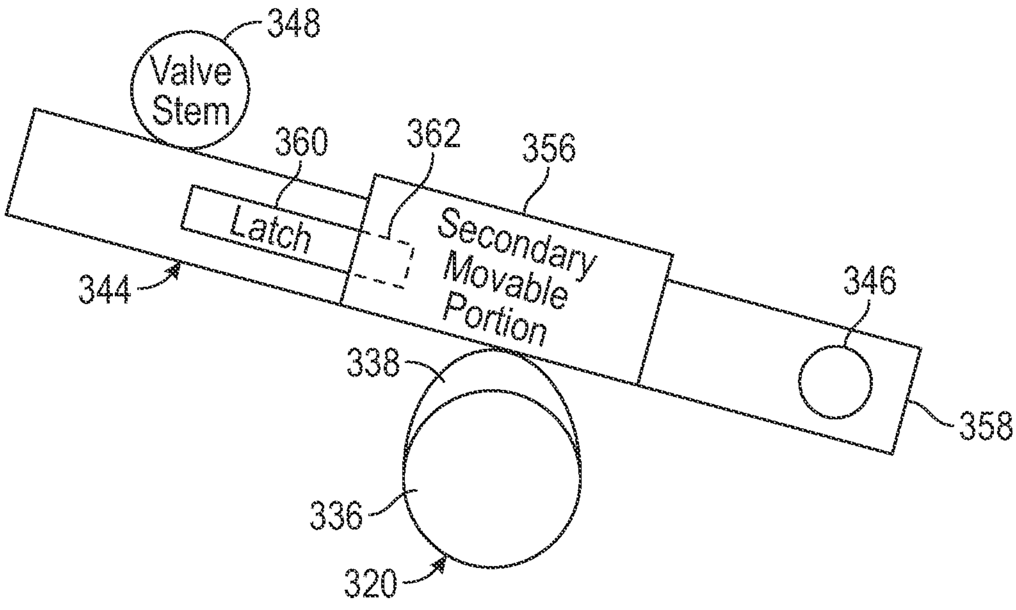

FIG. 3B shows finger follower 344 in a second configuration, in accordance with one or more embodiments. Here, the nose of the on lobe 336 is shown in a "12 o'clock" position, wherein the on lobe 336 has engaged a surface of finger follower 344 (such as, on secondary movable portion 356 itself) and caused the entire finger follower 344 to pivot about pivot 346 and displace the valve stem 348. Continued rotation of cam 320 then causes the valve stem 348 to reciprocate and thus effectively activate a valve (such as a scavenge exhaust valve 110*a* shown in FIG. 1) via opening and closing the valve.

Figure 3C:
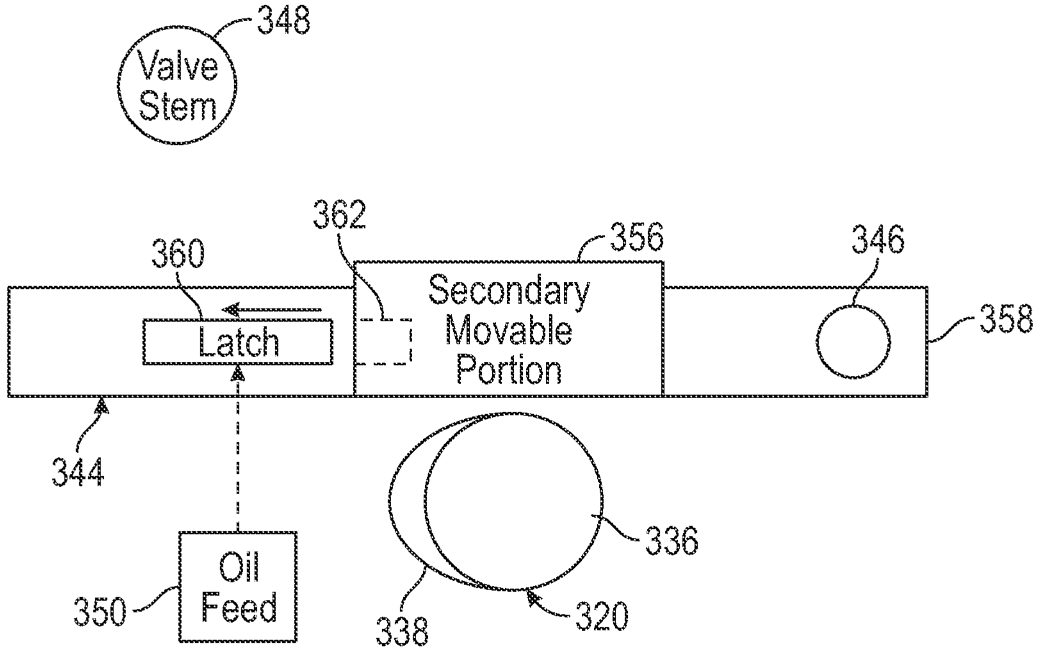

FIG. 3C shows finger follower 344 in a third configuration, in accordance with one or more embodiments. Thus, when oil pressure in feed 350 is relatively high, the latch or pin 360 may end up in a "retracted", "unlatched" or "unlocked" position to permit the secondary movable portion 356 to move independently with respect to the rest of the finger follower 144. Here, the nose of the on lobe 336 is again shown in a "9 o'clock" position where it has not yet engaged with any portion of finger follower 344.

Figure 3D:
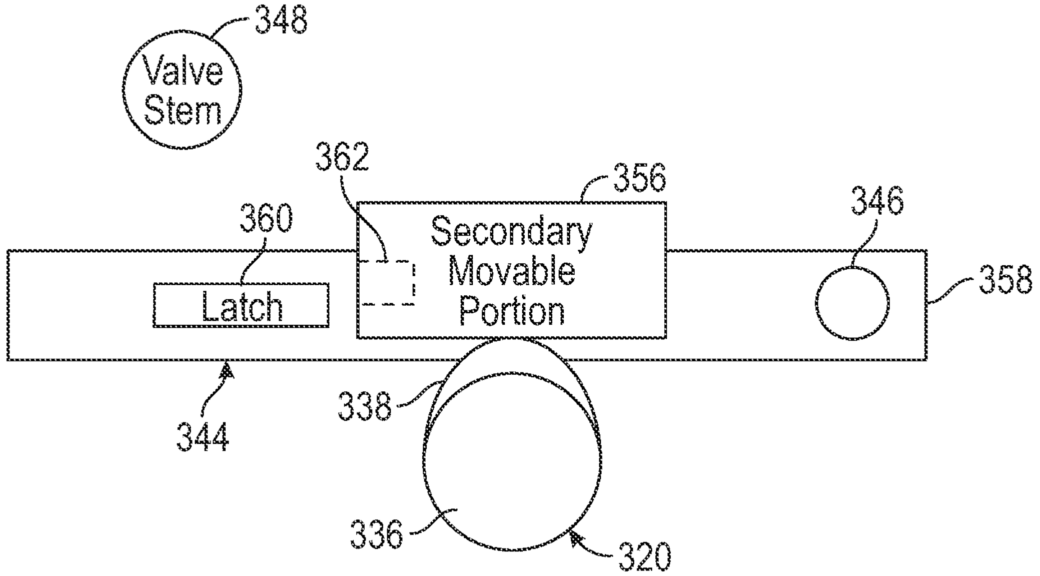

FIG. 3D shows finger follower 344 in a fourth configuration, in accordance with one or more embodiments. Here, the nose of the on lobe 336 is shown in a "12 o'clock" position, wherein the on lobe 336 has engaged a surface on secondary movable portion 356. As a result, the secondary movable portion 356 displaces to neutralize the physical effect of the on lobe 336. Since there is otherwise no cam profile associated with cam off lobe 338, there is no contact of the cam 320 with any other portion (e.g., with the main body 358) of finger follower 344. Thus, there is effectively no displacement of the finger follower 344 about pivot 346, thus keeping the valve stem 348 stationary and effectively deactivating the associated valve (such as a scavenge exhaust valve 110*a* shown in FIG. 1).

In accordance with one or more embodiments, though secondary movable portion 356 is very schematically shown as displacing in a sliding manner with respect to main body 358, it should be understood that other types of independent displacement of the secondary movable portion 356 are also possible. For instance, the secondary movable portion 356 may be pivot-mounted on main body 358, and may pivot in response to engagement by cam on lobe 336 while the main body 358 remains stationary.

In accordance with one or more embodiments, it should be understood that while a finger follower 344 for a scavenge exhaust valve has been described with respect to FIGS. 3A-3D, similar features and functions may analogously apply to a finger follower for a blowdown exhaust valve, and in the context of arrangements such as those shown in FIGS. 1 and 2. Additionally, while switchable finger followers have been discussed hereabove, it should be understood that a wide variety of substitutes are conceivable that would function analogously and provide a similar effect. For instance, an arrangement such as a switchable pivot element system, a sliding cam system or an electrohydraulic valve train system could be used without departing from the scope disclosed herein.

Figure 4:
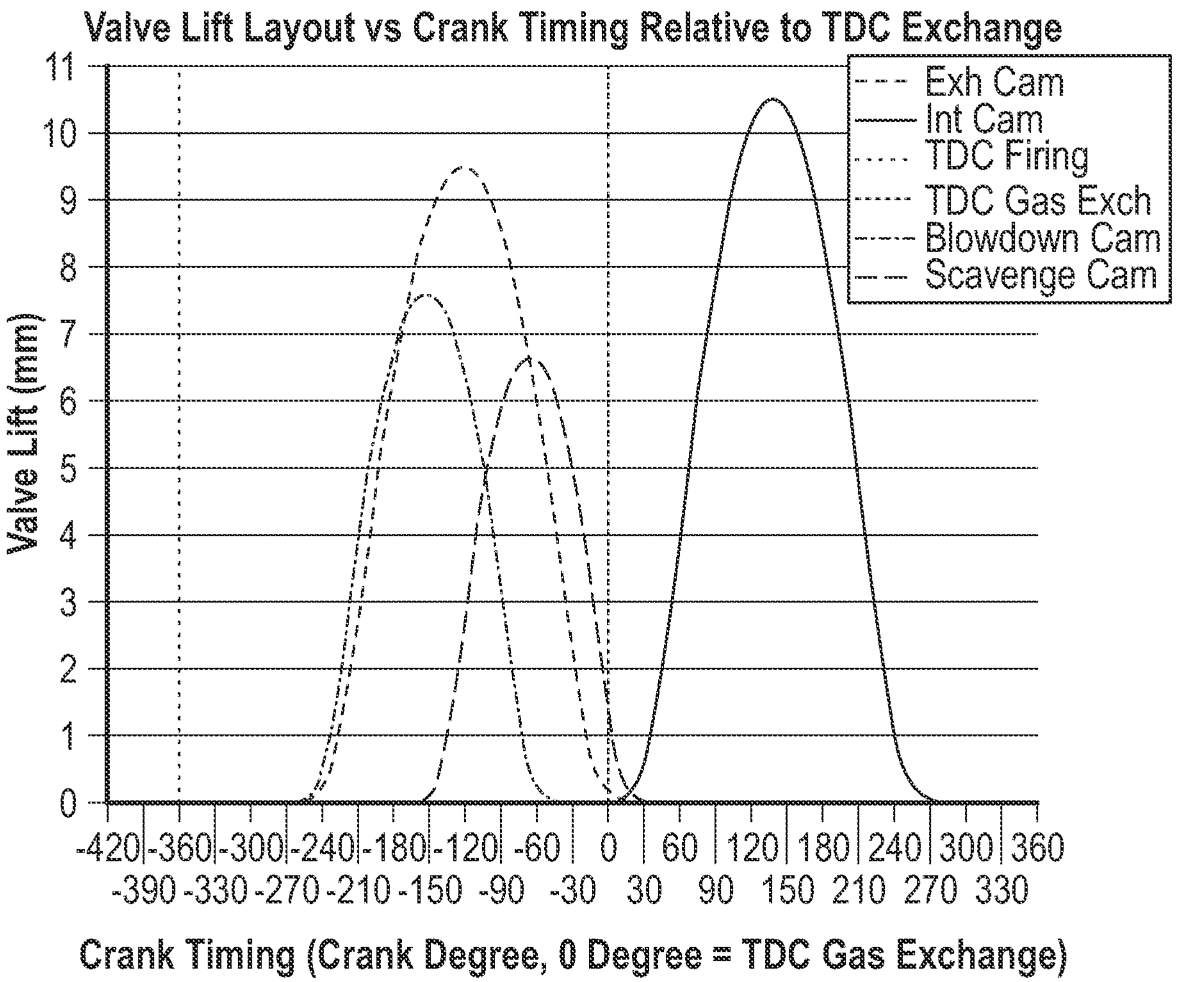
FIG. 4 graphically illustrates, in accordance with one or more embodiments, an effect of differing cam profiles on scavenge and blowdown exhaust valves.

FIG. 4 graphically illustrates, in accordance with one or more embodiments, an effect of differing cam profiles on scavenge and blowdown exhaust valves, by way of an illustrative and non-restrictive working example. Thus, the graph in FIG. 4 plots valve lift against crank timing.

In accordance with one or more embodiments, and relative to the example shown in FIGS. 1 and 2, valve lift may correspond to the displacement of a valve stem 148, 156 and crank timing may correspond to rotational displacement of cam shaft 114 relative to TDC (top dead center). Vertical data lines in FIG. 4 correspond to TDC firing and gas exchange as shown. As also shown, the cam profiles of scavenge and blowdown cams 120, 122 may be configured differently so as to effect differing patterns and timings of valve lift when the cam shaft 114 rotates. Also shown is a curve (“Int Cam”) corresponding to valve lift for the intake valves 108. Additionally, for comparison purposes, the “Exh Cam” curve represents a conventional exhaust cam lift profile. In the context of the present illustrative example, the “Exh Cam” curve should be understood to as being replaced by the scavenge and blowdown cam profiles in the context of a divided exhaust boost system as broadly contemplated herein.

Figure 5:
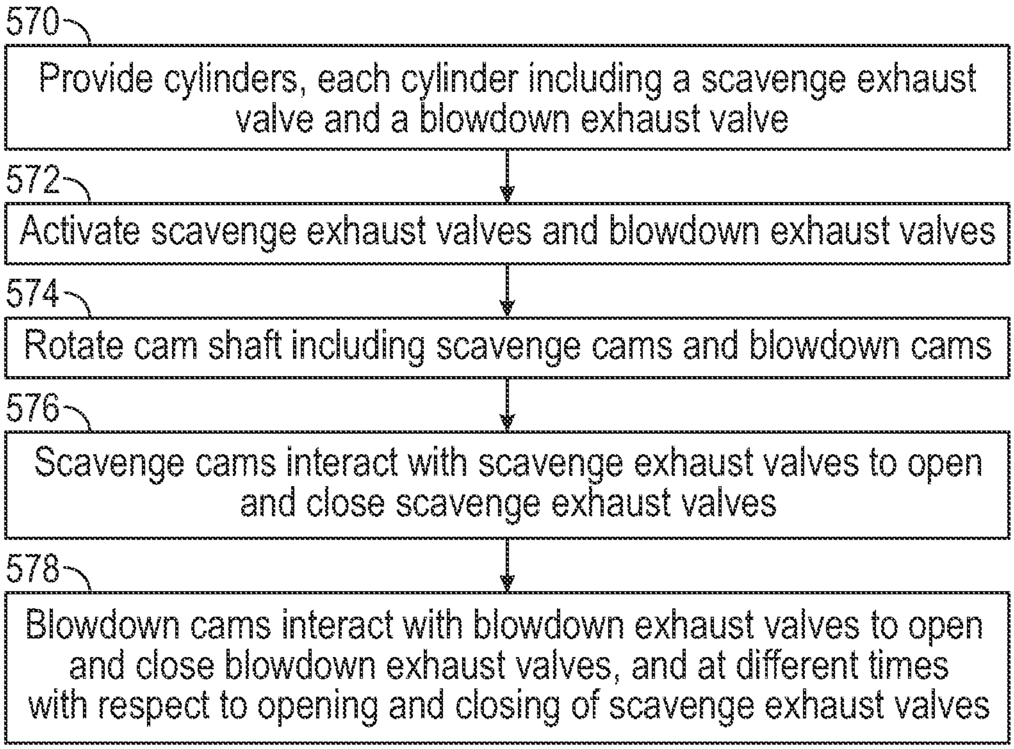
FIG. 5 provides a flowchart of a method in accordance with one or more embodiments.

FIG. 5 provides a flowchart of a method in accordance with one or more embodiments. Specifically, FIG. 5 describes a method of operating an exhaust system. One or more blocks in FIG. 5 may be performed using one or more components as described in FIGS. 1-4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, in accordance with one or more embodiments, a plurality of cylinders are provided in an engine, each cylinder including a scavenge exhaust valve and a blowdown exhaust valve (Step 570). This can correspond to the engine 104, cylinders 106 and scavenge exhaust valves 110*a* and blowdown exhaust valves 110*b* shown in FIG. 1. The scavenge exhaust valves and the blowdown exhaust valves can be activated (Step 572). This may correspond to feeding oil to the scavenge exhaust valves 110*a* and blowdown exhaust valves 110*b* via the oil galleries 126 and 128, respectively, as described and illustrated herein. A cam shaft including a plurality of scavenge cams and a plurality of blowdown cams can be rotated (Step 574). This can correspond to rotation of cam shaft 114, with scavenge cams 120 and blowdown cams 122, as described and illustrated with respect to FIGS. 1 and 2.

In accordance with one or more embodiments, during rotation of the cam shaft, the scavenge cams can interact with the scavenge exhaust valves to open and close the scavenge exhaust valves (Step 576). Also during rotation of the cam shaft, the blowdown cams can interact with the blowdown exhaust valves to open and close the blowdown exhaust valves, and at different times with respect to the opening and closing of the scavenge exhaust valves (Step 578). This can correspond to the opening and closing of scavenge and blowdown exhaust valves 110*a*, 110*b*, via the scavenge cams 120 and blowdown cams 122, as described and illustrated with respect to FIGS. 1 and 2. This can also be appreciated, by way of illustrative and non-restrictive example, with reference to the graph described and illustrated with respect to FIG. 4.

Instead of using two external valves (namely the blow down valve and the scavenging valve) to control the route of exhaust gas flow, embodiments disclosed herein use the exhaust valve originally on the engine to control the exhaust gas flow for divided exhaust boost. In addition, those exhaust valves are controlled by the process of FIG. 4 so they can achieve the flow direction that a divided exhaust boost system requires. the exhaust valves originally on the engine cylinder head is used to control the flow of exhaust gas to the divided exhaust systems. This not only increases the exhaust gas temperature limit due to exhaust valve design specification and reduces flow inefficiency when flow in and out of exhaust ports to extend the benefit of divided exhaust boost on engine emission and efficiency.

In view of the foregoing, it should be appreciated that, in accordance with one or more embodiments, advantages are gained via effectively increasing a limit of exhaust gas temperatures in comparison with the conventional arrangement noted earlier. Particularly, this is permitted via exhaust valve design specifications and also via an appreciable increase in flow efficiency via the use of exhaust ports on the engine. This enhances general benefits associated with a divided exhaust boost in relation to engine emissions and efficiency.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words ‘means for’ together with an associated function.

What is claimed:

1. An exhaust system comprising:
a plurality of cylinders;
each cylinder comprising a scavenge exhaust valve and a blowdown exhaust valve;
an arrangement that activates and deactivates the scavenge exhaust valves and the blowdown exhaust valves, the arrangement comprising:
a first oil gallery that feeds oil to each of the scavenge exhaust valves; and
a second oil gallery, separate from the first oil gallery, that feeds oil to each of the blowdown exhaust valves;
a scavenge path leading from the scavenge exhaust valves;
a blowdown path leading from the blowdown exhaust valves; and
a cam shaft including a plurality of scavenge cams and a plurality of blowdown cams;
wherein, during rotation of the cam shaft:
the scavenge cams interact with the scavenge exhaust valves to open and close the scavenge exhaust valves when the scavenge exhaust valves are activated; and
the blowdown cams interact with the blowdown exhaust valves to open and close the blowdown exhaust valves when the blowdown exhaust valves are activated, and at different times with respect to the opening and closing of the scavenge exhaust valves;
wherein, when viewed along an axial direction with respect to the cam shaft, the scavenge cams each include a first off lobe, an on lobe and a second off lobe, wherein the on lobe is axially offset from the first and second off lobes; and
the scavenge exhaust valves each include a movable component,
wherein the on lobe includes a cam profile to engage with the movable component to periodically move the movable component and open and close the scavenge exhaust valve, and
wherein the first and second off lobes each include no cam profile configured to effect movement of the movable component.

2. The exhaust system according to claim 1, further comprising:
a turbine;
wherein the blowdown path leads from the blowdown exhaust valves to the turbine.

3. The exhaust system according to claim 2, wherein the scavenge path bypasses the turbine.

4. The exhaust system according to claim 3, further comprising:
a catalytic converter;
wherein the scavenge path leads from the scavenge exhaust valves to the catalytic converter.

5. The exhaust system according to claim 1, wherein the arrangement that activates and deactivates the scavenge exhaust valves and the blowdown exhaust valves comprises:
an oil line;
a first oil valve that admits a flow of oil from the oil line to the first oil gallery; and
a second oil valve that admits a flow of oil from the oil line to the second oil gallery.

6. The exhaust system according to claim 5, wherein:
the arrangement that activates and deactivates the scavenge exhaust valves and the blowdown exhaust valves comprises a control unit; and
the control unit controls opening and closing of each of the first and second oil valves.

7. The exhaust system according to claim 6, wherein:
the scavenge exhaust valves are activated in response to closure of the first oil valve and a reduction in oil pressure in the first oil gallery; and
the blowdown exhaust valves are activated in response to closure of the second oil valve and a reduction in oil pressure in the second oil gallery.

8. The exhaust system according to claim 7, wherein:
the scavenge exhaust valves are deactivated in response to opening of the first oil valve and an increase in oil pressure in the first oil gallery; and
the blowdown exhaust valves are deactivated in response to opening of the second oil valve and an increase in oil pressure in the second oil gallery.

9. The exhaust system according to claim 6, wherein:
the scavenge exhaust valves are deactivated in response to opening of the first oil valve and an increase in oil pressure in the first oil gallery; and
the blowdown exhaust valves are deactivated in response to opening of the second oil valve and an increase in oil pressure in the second oil gallery.

10. The exhaust system according to claim 1, wherein the movable component comprises a switchable finger follower.

11. The exhaust system according to claim 1, wherein:
the blowdown cams each include an on lobe and one or more off lobes; and
the blowdown exhaust valves each include a movable component;
wherein the on lobes of the blowdown cams each include a cam profile to engage with the movable component to periodically move the movable component and open and close the blowdown exhaust valve; and
wherein the one or more off lobes of each of the blowdown cams include no cam profile configured to effect movement of the movable component.

12. The exhaust system according to claim 11, wherein the movable component comprises a switchable finger follower.

13. The exhaust system according to claim 11, wherein:
the one or more off lobes of each of the blowdown cams comprise a first off lobe and a second off lobe;
when viewed along an axial direction with respect to the cam shaft, the blowdown cams each include the first off lobe, the on lobe and the second off lobe, wherein the on lobe is axially offset from the first and second off lobes.

14. A method comprising:
providing a plurality of cylinders in an engine, each cylinder comprising a scavenge exhaust valve and a blowdown exhaust valve;
activating the scavenge exhaust valves and the blowdown exhaust valves via:
feeding oil to each of the scavenge exhaust valves via a first oil gallery; and
feeding oil to each of the blowdown exhaust valves via a second oil gallery that is separate from the first oil gallery; and
rotating a cam shaft including a plurality of scavenge cams and a plurality of blowdown cams;
wherein, during rotation of the cam shaft:
the scavenge cams interact with the scavenge exhaust valves to open and close the scavenge exhaust valves; and
the blowdown cams interact with the blowdown exhaust valves to open and close the blowdown exhaust valves, and at different times with respect to the opening and closing of the scavenge exhaust valves;

wherein, when viewed along an axial direction with respect to the cam shaft, the scavenge cams each include a first off lobe, an on lobe and a second off lobe, wherein the on lobe is axially offset from the first and second off lobes; and the scavenge exhaust valves each include a movable component, wherein the on lobe includes a cam profile to engage with the movable component to periodically move the movable component and open and close the scavenge exhaust valve, and wherein the first and second off lobes each include no cam profile configured to effect movement of the movable component.

15. The method according to claim 14, wherein activating the scavenge exhaust valves and the blowdown exhaust valves comprises feeding oil to the scavenge exhaust valves and the blowdown exhaust valves.

16. The method according to claim 15, wherein the scavenge exhaust valves and the blowdown exhaust valves are activated independently of one another.

17. The method according to claim 16, wherein:

the scavenge exhaust valves are activated via feeding oil to the scavenge exhaust valves at a first oil pressure level; and the scavenge exhaust valves are deactivated via feeding oil to the scavenge exhaust valves at a second oil pressure level that is greater than the first oil pressure level.

18. The method according to claim 16, wherein:

the blowdown exhaust valves are activated via feeding oil to the blowdown exhaust valves at a first oil pressure level; and the blowdown exhaust valves are deactivated via feeding oil to the blowdown exhaust valves at a second oil pressure level that is greater than the first oil pressure level.

* * * * *